United States Patent
Newton

(10) Patent No.: US 11,086,960 B2
(45) Date of Patent: Aug. 10, 2021

(54) EXTENSION FOR TARGETED INVALIDATION OF CACHED ASSETS

(71) Applicant: NETFLIX, INC., Los Gatos, CA (US)

(72) Inventor: Christopher Newton, West Lake Village, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/926,555

(22) Filed: Jul. 10, 2020

(65) Prior Publication Data

US 2021/0019359 A1 Jan. 21, 2021

Related U.S. Application Data

(60) Provisional application No. 62/875,475, filed on Jul. 17, 2019.

(51) Int. Cl.
| | |
|---|---|
| *G06F 16/955* | (2019.01) |
| *G06F 16/957* | (2019.01) |
| *G06F 21/64* | (2013.01) |
| *H04L 29/08* | (2006.01) |

(52) U.S. Cl.
CPC ........ *G06F 16/9574* (2019.01); *G06F 16/955* (2019.01); *G06F 21/64* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 9,185,598 B2 | 11/2015 | Wu et al. | |
| 9,591,047 B1 | 3/2017 | Newton et al. | |
| 9,634,905 B2 | 4/2017 | Newton et al. | |
| 10,608,894 B2 | 3/2020 | Newton et al. | |
| 2003/0097564 A1 | 5/2003 | Tewari et al. | |
| 2013/0238768 A1* | 9/2013 | Vaidya | H04L 67/14 709/220 |
| 2014/0201164 A1* | 7/2014 | Skinder | G06F 21/6218 707/687 |
| 2017/0093798 A1* | 3/2017 | McKinion | H04L 63/0281 |

FOREIGN PATENT DOCUMENTS

TW 201739217 A * 4/2017 ........... H04L 12/703

OTHER PUBLICATIONS

International Search Report for application No. PCT/US2020/042299 dated Sep. 16, 2020.

* cited by examiner

*Primary Examiner* — Natisha D Cox
(74) *Attorney, Agent, or Firm* — Artegis Law Group, LLP

(57) ABSTRACT

Various embodiments of the present disclosure relate to a computer-implemented method of receiving an invalidation command that includes a first asset identifier, and a set of extension value fields, identifying a first file that is stored in a first cache device and is associated with an identifier matching the first asset identifier, comparing attributes of the first file to the set of extension value fields, and upon determining that, for each extension value field, at least one attribute of the first file matches at least one value of the extension value field, causing the first file in the first cache device to be preserved, or upon determining that, for at least one extension value, at least one attribute of the first file does not match at least one value of the extension value field, causing the first file to be invalidated.

20 Claims, 8 Drawing Sheets

EXTENSION FOR TARGETED INVALIDATION OF CACHED ASSETS

CROSS REFERENCE TO RELATED APPLICATIONS

This application claims priority benefit of United States Provisional patent application titled, "TECHNIQUES FOR PERFORMING CACHE INVALIDATIONS," filed Jul. 17, 2019 and having Ser. No. 62/875,475. The subject matter of this related application is hereby incorporated herein by reference.

BACKGROUND

Field of the Various Embodiments

Embodiments of the present disclosure relate generally to distributed computing systems and, more specifically, to an extension for targeted invalidation of cached assets.

Description of the Related Art

Distributed computing systems include many different hardware and software components that operate to provide a variety of services to clients of the distributed computer systems. For example, a distributed computing system executing a video streaming service could provide access to a library of media titles that can be viewed on a range of different client devices. The distributed computing system offers clients access to the media library, where a client requests a particular media item (e.g., film, television episode, music video, etc.) and the content provider sends the media item to the client device. Conventional content streaming services enhance streaming performance by storing digital content related to media items at various cache devices within a content delivery network (CDN). In such a manner, a given client device may be served by a cache device delivering requested content in lieu of an origin server or content library delivering the requested content. When such cache devices are closer to the client device, the cache device more efficiently serves content to the client devices than the origin server delivering the content.

One drawback with using cache devices in a distributed computing system is that the copies of a media item stored on the various cache devices may not match the media item that is delivered by the origin server. In such instances, the cache server responds to requests by serving an outdated or otherwise invalid version of the media item, degrading playback and hindering the viewing experience by the client. Conventional content distribution systems employ various techniques to ensure that copies of a particular media item are valid and up-to-date. For example, in addition to adhering to Hypertext Transfer Protocol (HTTP) header expiration policies, conventional content distribution networks also have cache devices respond to invalidation commands. The invalidation command causes the cache device to revalidate a given media item at certain points in time, such as when the cache device subsequently receives a request for the media item from a client device. However, techniques that require a cache device to routinely invalidate media items causes strain on the network by having the cache device continually revalidate each media item. Further, additional issues may arise within the origin server or the CDN, which cause inconsistencies in the copies of an object stored in various devices within the CDN. Employing invalidation commands through the CDN to remove bad copies of a media item within the CDN would cause a system-wide invalidation, requiring each cache device in the distributed computing system to reacquire the media item from the origin server.

As the foregoing illustrates, more effective techniques for managing cached digital items are needed in the art.

SUMMARY

Various embodiments of the present disclosure relate to a computer-implemented method of receiving an invalidation command that includes a first asset identifier, and a set of one or more extension value fields, identifying a first file that is stored in a first cache device and is associated with an identifier matching the first asset identifier, comparing a set of attributes of the first file to the set of one or more extension value fields, and upon determining that, for each extension value field included in the set of one or more extension value fields, at least one attribute included in the set of attributes of the first file matches at least one value of the extension value field, causing the first file in the first cache device to be preserved, or upon determining that, for at least one extension value field included in the set of one or more extension value fields, at least one attribute of the first file does not match at least one value of the extension value field, causing the first file to be invalidated.

Other embodiments include, without limitation, a computer system that performs one or more aspects of the disclosed techniques, as well as one or more non-transitory computer-readable storage media including instructions for performing one or more aspects of the disclosed techniques.

At least one technological advantage of the disclosed techniques relative to the prior art is that cache devices within a content distribution network can effectively remove bad copies of a given asset without requiring network-wide invalidation of the asset. In particular, because a storage controller compares file attributes and extension values and causes certain candidate files to be invalidated, a cache device can cause a valid copy of an asset to be preserved, while causing an invalid version of the asset, which changed at some point during distribution, storage, or use, to be removed. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
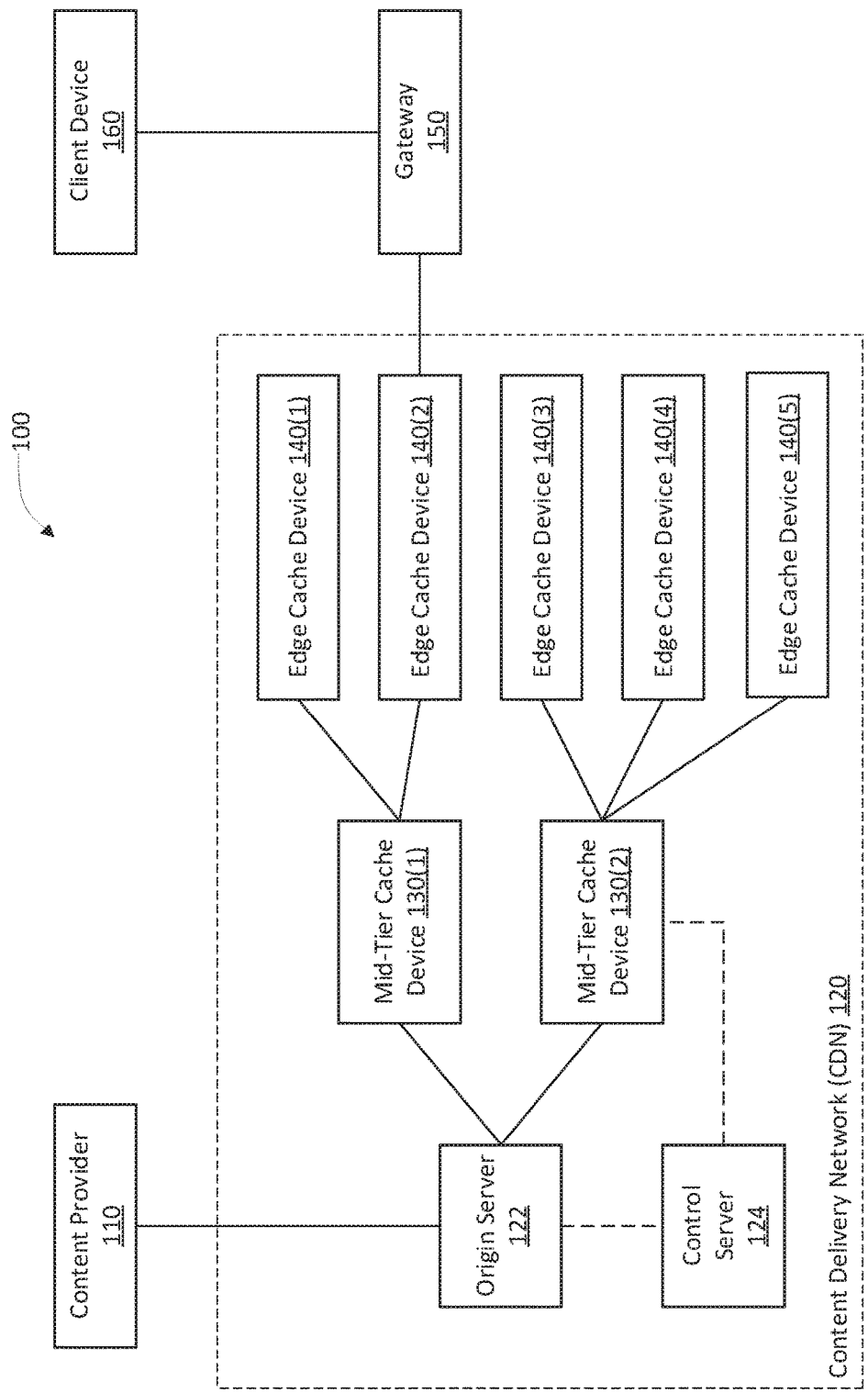
FIG. 1 illustrates a network infrastructure that is configured to implement one or more aspects of the present disclosure.

In the following description, numerous specific details are set forth to provide a more thorough understanding of the various embodiments. However, it will be apparent to one skilled in the art that the inventive concepts may be practiced without one or more of these specific details.

A video streaming service provides high-quality content to viewers. In certain instances, the video streaming service uses a content distribution network (CDN) to efficiently deliver digital content to a large number of client devices. In particular, the CDN includes a number of cache devices that store copies of a given asset in order to efficiently deliver content to a client. Due to various factors, such as proximity, computational load, etc., a cache device delivering a copy of an asset, in lieu of a single origin server, enhances the playback experience employed by the client. One technique to maintain the efficacy of the CDN is to ensure that each copy of an asset, stored on the various cache devices, is valid.

Prior art techniques required system-wide changes to an asset to ensure validity of assets stored in the cache devices. For example, when multiple copies of an asset are corrupt, each cache device would receive an invalidation command that caused the respective local copy of the asset to be invalidated. Each cache device would subsequently attempt to reload the asset by requesting a valid copy from the origin server. However, such techniques are inefficient and strain the CDN when a small, but non-zero, percentage of the total distributed set of copies are corrupt. Other prior art techniques have a device check if a copy of an asset is invalid by only checking the header information of the file. However, such techniques were ineffective in identifying corrupt copies of an asset that had correct header information, but incorrect payload information.

In contrast, the disclosed network and associated disclosed techniques provide a technique to selectively target corrupt or otherwise non-matching copies of an asset that are stored as files in various cache devices distributed throughout the CDN. A storage controller processes a targeted invalidation command associated with a valid asset in order to determine whether a copy of an asset, stored on a cache device as a local file, has specific attributes that do not match values of a corresponding valid version of the asset. When the storage controller determines that the file has at least one non-matching attribute, the storage controller causes the copy of the asset to be invalidated. When a given a copy of the asset is invalidated, the cache device reloads the asset by acquiring a valid copy from another device.

For example, a storage controller in a cache device receives a targeted invalidation command that identifies an asset and specifies attributes or attribute ranges associated with a valid version of an asset. The targeted invalidation command includes a unique identifier for the asset, as well as a set of extension value fields (e.g., length, checksum, etc.) that correspond to file attributes of a valid version of the asset. The storage controller uses the unique identifier as a key to find a stored copy of the asset on a given cache device. The storage controller compares each extension value field to attributes of the copy of the asset. When the storage controller determines that, for each extension value field, an attribute of the copy of the asset matches at least one value listed in the extension value field, the storage controller determines that the copy of the asset is valid and causes the copy to be preserved or otherwise maintained in the cache device. Otherwise, the storage controller determines that, for at least one extension value field, the attribute of the copy of the asset does not match any of the listed values and determines that the copy of the asset is corrupt or otherwise invalid. The storage controller causes the copy of the asset to be invalidated and causes a valid copy to be reloaded from another device.

Advantageously, various cache devices within the CDN effectively identify corrupt copies of a given asset, while only invalidating those particular copies that the storage controller identifies as corrupt. More specifically, conventional CDNs would remove one or more corrupt copies of an asset by performing a system-wide invalidation of every copy of a given asset, or risk preserving some corrupt copies of the asset that were not otherwise identified using a conventional invalidation command. By contrast, a distributed network that uses the disclosed techniques frees computing and network resources of the CDN by processing the set of extension value fields included in a targeted invalidation command for an asset. The storage controller effectively causes valid copies of an asset, which have attributes matching the extension values specified in extension value fields of the targeted invalidation command, to be preserved. Such a technique thereby limits the number of copies of an asset within the CDN that are invalidated and thus require reload in response to processing a given invalidation command.

FIG. 1 illustrates a network infrastructure 100 that is configured to implement one or more aspects of the present disclosure. As shown, network infrastructure 100 includes content provider 110, content delivery network (CDN) 120, gateway 150, and client device 160. CDN 120 includes origin server 122, control server 124, mid-tier cache devices 130, and edge cache devices 140.

For explanatory purposes, multiple instances of like objects are denoted with reference numbers identifying the object and additional numbers identifying the instance where needed. Further, network infrastructure 100 includes multiple instances of devices, even when not shown. For example, network infrastructure 100 could include multiple content providers 110 (e.g., 110(1), 110(2), etc.), client devices 160 (e.g., 160(1), 160(2), etc.), and/or control servers 124 (e.g., 124(1,) 124(2), etc.), and still be within the scope of the disclosed embodiments.

In operation, content provider 110 provides one or more media applications to origin server 122. Origin server 122 ingests a given media application and stores the media application as one or more assets. In various embodiments, control server 124 may manage the distribution of assets, where copies of assets are stored in one or more cache devices 130, 140. For example, when a client device 160 requests an asset, a cache device within CDN 120 (e.g., edge cache device 140(2)) may respond to the request by determining whether the asset is stored locally. When the cache device determines that a copy of the asset is stored locally, the cache device storing the asset provides the asset to client device 160 (via gateway 150) in lieu of origin server 122.

In some embodiments, the edge cache devices may retrieve and store assets on an on-demand basis in response to various client requests. For example, edge cache device 140(2) could receive a request from client device 160 for a particular asset and may respond to the request for the particular asset by retrieving the asset from origin server 122 via one or more other cache devices (e.g., mid-tier cache devices 130 and/or other edge cache devices 140).

Content provider 110 provides content that one or more client devices 160 can access. For example, content provider 110 may generate one or more media streams as content, where a given media stream includes a plurality of assets that may include video data, audio data, textual data, graphical data, metadata, and/or other types of data. In some embodiments, content provider 110 may forward a media application and/or one or more media streams to origin server 122 for ingestion. In such instances, origin server 122 may store the plurality of assets in one or more devices within content delivery network 120. For example, origin server 122 could store the plurality of assets as a media application (e.g., an episode of a television program) within a content library (not shown).

Content delivery network (CDN) 120 distributes content to clients on behalf of one or more content providers 110. In various embodiments, CDN 120 includes multiple devices that control the efficient delivery of resources to one or more client devices 160. For example, upon origin server 122 ingesting an asset, control server 124 could cause multiple copies of the asset to be stored in multiple cache devices 130, 140, such that a request made by client device 160 for the asset is handled by a cache device 130, 140, in lieu of origin server 122 handling each request. Such techniques reduce the load placed on origin server 122. Additionally or alternatively, a cache device, such as edge cache device 140(4), could respond to a received client request by retrieving the asset from the content library and delivering the asset to a client device 160. In such instances, edge cache device 140(4) could respond to subsequent requests for the asset by retrieving a copy of the asset from local storage and delivering the asset to the client device.

In various embodiments, CDN 120 may include multiple tiers of cache devices. As shown, for example, CDN 120 includes two tiers of cache devices, including mid-tier cache devices 130 and edge cache devices 140. Each tier of cache devices may comprise various quantities of specific cache devices. Additionally or alternatively, a given mid-tier cache device 130 is referred to as a parent cache to the applicable edge cache device(s) 140. For example, mid-tier cache device 130(1) could be a parent to edge cache devices 140(1), 140(2). There may be any number of cache devices in each tier, and any number of tiers in CDN 120.

Origin server 122 is a computer system configured to serve download requests for content from client device 160. The content may be stored as digital content files (e.g., one or more media assets) that may reside on a mass storage system accessible to origin server 122. The mass storage system may include, without limitation, direct-attached storage, network-attached file storage, or network-attached block-level storage. In various embodiments, origin server 122 stores a first copy of an asset in the mass storage system and acts as an authoritative repository, or primary storage location, for the one or more assets. In various embodiments, the asset stored in the mass storage system acts as a source of truth. In such instances, file attributes associated with the asset stored in the mass storage systems are retrieved to identify valid copies of the assets that are stored in cache devices 130, 140.

Control server 124 operates origin server 122 and one or more cache devices 130, 140 to monitor and selectively fill the cache devices 130, 140 with copies of assets ingested by origin server 122. In various embodiments, control server 124 may communicate with one or more of origin server 122 and/or cache devices 130, 140 in order to manage the storage of assets within the plurality of cache devices 130, 140. Additionally or alternatively, control server 124 may manage the distribution and maintenance of an asset within CDN 120. For example, control server 124 could cause origin server 122 and/or various cache devices 130, 140 within CDN to distribute copies of a given asset such that cache devices 130, 140 provide the asset from respective local storage in lieu of sending requests to origin server 122.

In various embodiments, control server 124 may perform targeted invalidation of one or more copies of a given asset by processing a targeted invalidation command that specifies certain attributes of a given asset (e.g., file attributes of an asset as stored in the content library). In such instances, control server 124 may identify invalid copies of the asset that are stored in one or more cache devices 130, 140 and may cause cache devices that are storing invalid copies to mark such copies as invalid and load valid copies of the asset from other cache devices 130, 140. Additionally or alternatively, control server 124 may receive a targeted invalidation command from a publisher. For example, a publisher (not shown) could broadcast an invalidation command. In such instances, control server 124 could receive the broadcasted invalidation command and control the distribution of the invalidation command to the various cache devices 130, 140.

Cache devices 130, 140 provide cache services for network infrastructure 100 and CDN 120 specifically by storing copies of assets. In various embodiments, control server 124 may cause a given asset to be copied and stored in one or more mid-tier cache devices 130 and/or edge cache devices 140 as one or more files in a given file directory. In such instances, control server 124 may cause one or more cache-fill commands to fill the storage of a given cache device 130, 140 with assets ingested by origin server 122. Additionally or alternatively, cache devices 130, 140 may fill the storage of a given cache device 130, 140 on an on-demand basis by responding to a series of client requests.

Mid-tier cache devices 130 (e.g., 130(1)-130(2)) and edge cache devices 140 (e.g., 140(1)-140(5)) are geographically distributed throughout the world, or within a given region. In various embodiments, a given edge cache device 140 may typically be located logically or physically closer to client device 160 than mid-tier cache devices 130 and/or origin server 122. Although FIG. 1 shows CDN 120 having three tiers of origin server 122 and/or cache devices 130, 140, persons skilled in the art will recognize that the architecture of CDN 120 contemplates only an example embodiment. Other embodiments may include additional middle-tier levels of mid-tier cache devices 130, or a single-tier CDN 120. In some embodiments, CDN 120 may be a peer-to-peer network, where no strict hierarchy of cache devices 130, 140 is maintained. Thus, FIG. 1 is in no way intended to limit the scope of the embodiments in any way.

Client device 160 is coupled via gateway 150 and/or one or more networks (not shown) to CDN 120. For example, client device 160 may connect directly to gateway 150, while gateway 150 connects via a public network to CDN 120. In such instances, client device 160 may act as an endpoint that receives a media application originating from content provider 110.

Figure 2:
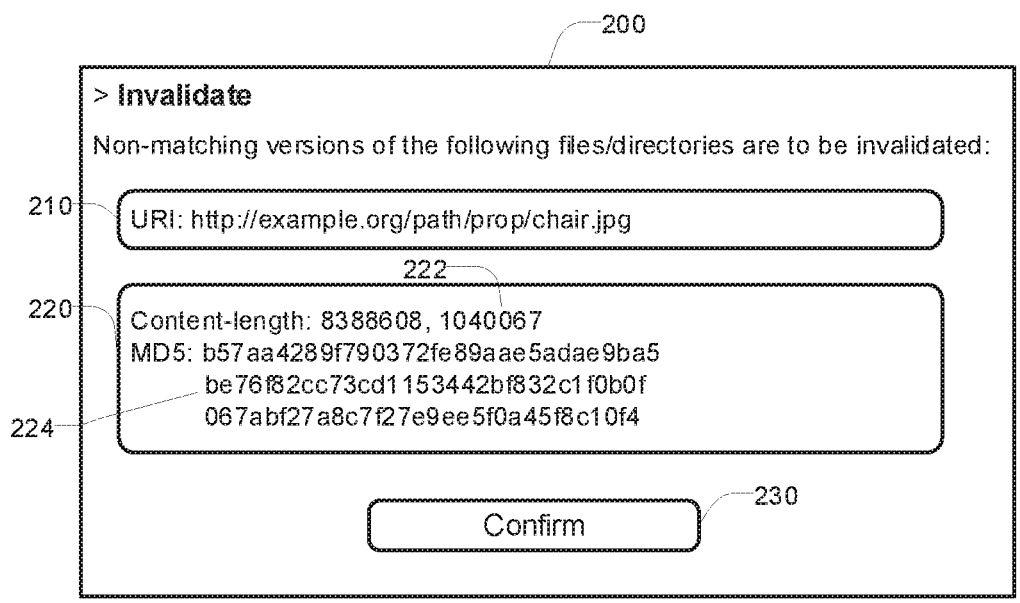
FIG. 2 is an example user interface for generating an invalidation command for a file stored in the network infrastructure of FIG. 1, according to various embodiments of the present disclosure.

FIG. 2 is an example user interface 200 for generating an invalidation command for a file stored in the network infrastructure 100 of FIG. 1, according to various embodiments of the present disclosure. As shown, user interface 200 includes request path 210, extension value fields 220, and confirmation button 230. Extension value fields 220 include a field for asset content length 222 and a field for asset checksum 224.

In operation, a user may generate a targeted invalidation command to invalidate non-matching copies of a given asset that are stored within network infrastructure 100. In such instances, a device, such as control server 124 or a publisher device, may enable the user to generate a targeted invalidation command that specifies a unique asset identifier (UAID) for a given asset. The device may also enable the user to specify values for a set of extension value fields 220, where specific values for each field included in the set of extension value fields 220 are associated with a valid version of the asset. One or more devices within CDN 120 (e.g., cache devices 130, 140, and/or control server 124) compare values of a file under inspection, with one or more values specified in the extension value fields 220, in order to determine whether a particular copy of an asset, identified via the UAID in the targeted invalidation command, is valid or corrupt.

For example, a given cache device 130, 140 could receive a corrupt copy of an asset and could store the asset locally as a local file. The local file could have a valid header and a corrupt payload. In such instances, the given cache device 130, 140 could successfully revalidate the local file, even though the payload is corrupt. In order to address such issues, a user may generate a targeted invalidation command that includes one or more extension value fields 220. In such instances, the extension value fields 220 specify attributes of a valid copy of a given asset.

In one example, a user could load a valid copy of an asset from the content library via origin server 122. The user could then retrieve particular attributes from the valid version of the asset, such as the size of the valid asset, and specify the obtained value as one of the values in an extension value field (e.g., specifying the retrieved value in content length extension value field 222). In another example, the user could generate a checksum of the valid asset, and list the value in an extension value field (e.g., specifying the generated value in checksum extension value field 224). In various embodiments, the user may specify one or more values for the respective content length extension value field 222 and/or the checksum extension value field 224 in the targeted invalidation command, in order to identify valid copies of the asset. A valid copy of the asset would be stored as a file that, for each extension value field 220, has a file attribute that matches at least one of the listed values included in the extension value fields 220.

In various embodiments, a user may specify a request path 210 that is used to identify a given asset. In some embodiments, cache device 130, 140, upon storing a copy of an asset, may generate a key for the copy that is based on an initial request path of the asset (as specified by origin server 122). In such instances, each copy of a given asset may share a common asset identifier that is based on the specific request path. In such instances, a user may specify request path 210 as a unique asset identifier for a given asset. In some embodiments, the unique asset identifier may be a uniform resource identifier (URI), such as a uniform resource locator (URL).

In some embodiments, the user may specify a request path 210 that corresponds to a directory (e.g., providing a URL with a wildcard designation at the end). In such instances, extension value fields 220 may correspond to attributes of a directory within a given cache device 130, 140. Additionally or alternatively, extension value fields 220 may list attribute values that correspond to attributes of multiple files in the directory. In such instances, control server 124 and/or cache device 130, 140 may process each file within the specified directory, and may mark an inspected file for invalidation upon determining that, for at least one extension value field 220 included in the invalidation command, an attribute of the file does not match at least one value listed for the extension value field 220. Alternatively, a cache device 130, 140 may process a targeted invalidation command that specifies a directory, where the cache device 130, 140 may cause all the contents of the directory to be invalidated.

Once the user identifies a specific asset or directory via request path 210 and specifies a set of extension value fields 220, the user generates the targeted invalidation command by selecting confirmation 230. In such instances, the targeted invalidation command is sent to one or more devices in CDN 120. For example, a user could publish the targeted invalidation command via a publisher device, and control server 124 could receive and process the targeted invalidation command received from the publisher device. Additionally or alternatively, one or more cache devices 130, 140 could receive and process the published targeted invalidation command directly from the publisher device.

In some embodiments, one or more devices in CDN 120 or another network may generate the targeted invalidation command. For example, control server 124 could periodically retrieve a valid asset via origin server 122 and may generate a targeted invalidation command based on the retrieved asset. In such instances, control server 124 generates and processes the targeted invalidation command in order to identify any corrupt versions of the asset within CDN 120. Additionally or alternatively, control server 124 and/or another device may track a given asset and may determine that at least two copies of a given asset are stored on different cache devices 130, 140, but not all attributes of the respective local files match. In such instances, control server 124 may retrieve the asset via origin server 122 in order to identify values of a valid version of the asset, and invalidate distributed copies of asset that are corrupt.

Figure 3:
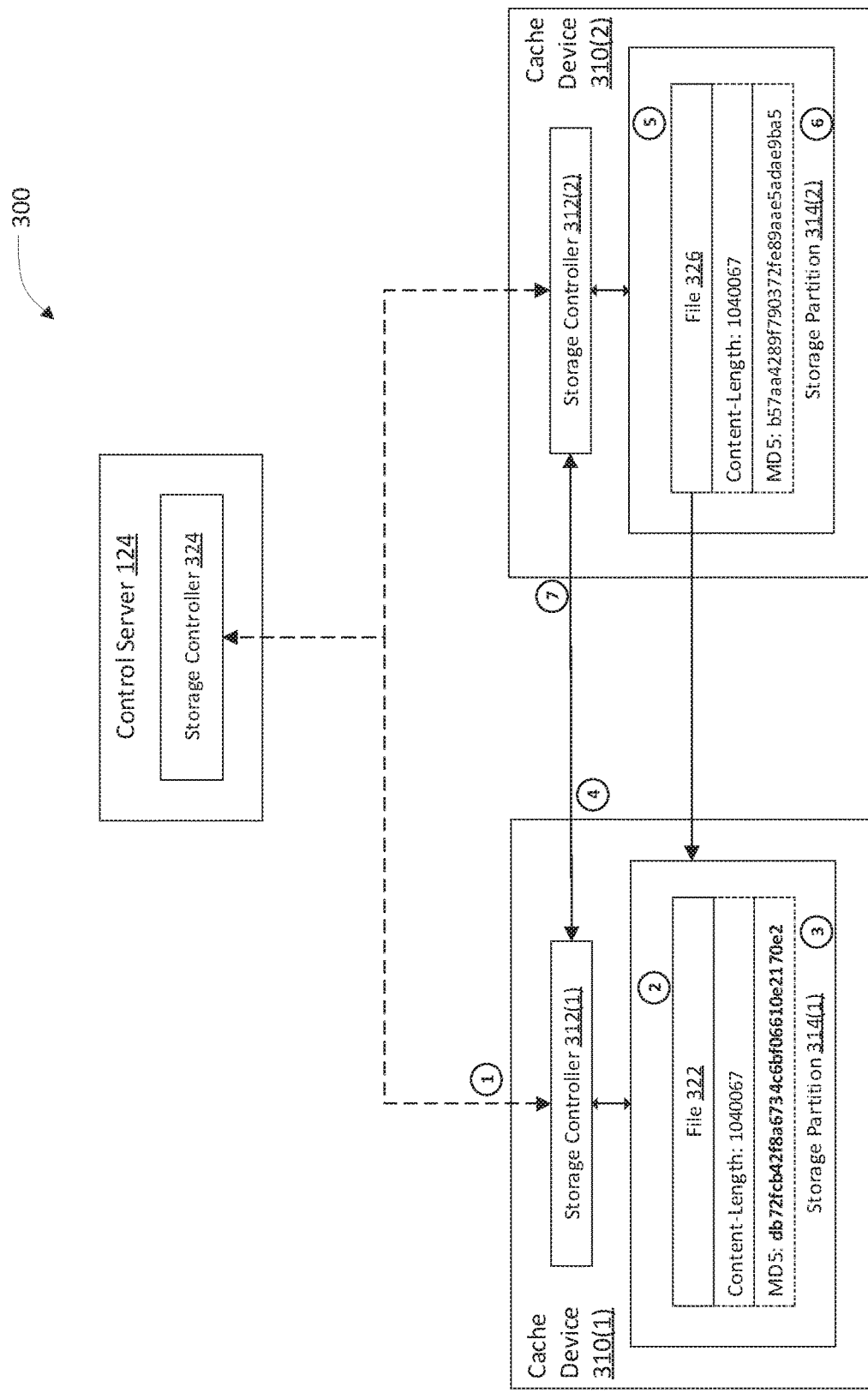
FIG. 3 is a more detailed illustration of an invalidation technique performed by various devices included in the network infrastructure of FIG. 1, according to various embodiments of the present disclosure.

FIG. 3 is a more detailed illustration of an invalidation technique performed by various devices included in the network infrastructure 100 of FIG. 1, according to various embodiments of the present disclosure. As shown, network infrastructure 300 includes control server 124 and cache devices 310(1) and 310(2). Control server 124 includes storage controller 324. Cache device 310(1) includes storage controller 312(1), storage partition 314(1), and file 322. Cache device 310(2) includes storage controller 312(2), storage partition 314(2), and file 326.

In some embodiments, storage controller 324 coordinates with one or more storage controllers 312 (e.g., 312(1), 312(2)) in particular cache devices 310(1), 310(2)), in order to check whether particular files 322, 326, which are identified as copies of a given asset, are invalid. In some embodiments, storage controller 324 may then cause a cache device (e.g., 310(1)) to reload the asset by acquiring a valid copy of the asset from another cache device. Additionally or alternatively, cache device 310(1) may receive a subsequent client request for the asset. In such instances, cache device 310(1) reloads a valid version of the asset when delivering the asset to client device 160.

Storage controller 324, 312(1), 312(2) is a component included in a device that manages the contents of storage. For example, storage controller 312(1) could manage the contents of storage partition 314(1) and communicate with other storage controllers (e.g., 312(2), 324) to indicate what storage partition 314(1) is currently storing. Additionally or alternatively, storage controller 312(1), local to a given cache device 310(1), may manage the transfer of a file between storage partition 314(1) and other devices. In various embodiments, storage controller 324 may manage the contents of each cache device 310(1), 310(2). In such instances, storage controller 324 may communicate with storage controllers 312(1), 312(2) in order to manage the respective contents of each storage partition 314(1), 314(2).

For explanatory purposes only, a series of numbered bubbles 1-7 depicts an example series of operations that occur when storage controller 324 and/or storage controller 312(1) processes a targeted invalidation command. As depicted with the bubble numbered 1, storage controller 312(1) included in cache device 310(1) receives the targeted invalidation command. In some embodiments, storage controller 312(1) may receive the targeted invalidation command from storage controller 324. In alternative embodiments, storage controller 312(1) may receive the targeted invalidation command from a different cache device, such as a parent cache device.

As depicted with the bubble numbered 2, storage controller 312(1) identifies file 322 as a candidate file. Storage controller 312(1) extracts the unique asset identifier from the targeted invalidation command and uses the unique asset identifier as a key in order to locate a corresponding candidate file, stored in storage partition 314(1), that has that unique asset identifier (e.g., file 322). In such instances, the candidate file is a version of the asset that is potentially valid (e.g., has a payload matching the asset), or is potentially invalid (e.g., the payload does not match the asset).

Upon identifying file 322 as a candidate file, and as depicted with the bubble numbered 3, storage controller 312(1) compares values listed in each extension value field 220, included in the targeted invalidation command, with attributes of the candidate file. Storage controller 312(1) retrieves a set of extension value fields included in the targeted invalidation command. For each retrieved extension value field, storage controller 312(1) compares a list of values, with one or more attributes of the local file and determines whether there is a match. For example, storage controller 312(1) could first compare a list of content length values (e.g., 8388608, 1040067) included in the content length extension value field 222, with the file size attribute of the candidate file. Based on the comparison, storage controller 312(1) could determine that the file size attribute associated with file 322 matches at least one of the listed values for the content length extension value field 222. Storage controller 312(1) could then compare a checksum attribute of the candidate file with each of the values listed in the checksum extension value field 224. Storage controller 312(1) could determine that the checksum attribute of the candidate file does not match any of the values for included in checksum extension value field 224.

As depicted with the bubble numbered 4, storage controller 312(1) determines that, for at least one extension value field 220, an attribute for the candidate file does not match any of the values listed in the extension value field 220. Storage controller 312(1) determines that the candidate file is an invalid version of the asset and is subject to invalidation. Storage controller 312(1) marks file 322 as invalid, where file 322 is marked to be erased and/or overwritten. Storage controller 312(1) may then immediately attempt to reload the asset by sending a request message to cache device 310(2) in order to receive a valid copy of the asset. In some embodiments, cache device 310(2) may be a peer of cache device 310(2). For example, cache device 310(1) could correspond to edge cache device 140(2), and cache device 310(2) could correspond to edge cache device 140(4). Alternatively, cache device 310(2) may be a parent of cache device 310(1). For example, cache device 310(1) could correspond to edge cache device 140(2), and cache device 310(2) could correspond to mid-tier cache device 130(1).

As depicted with the bubble numbered 5, storage controller 312(2) of cache device 310(2) identifies file 326 as a candidate file. Upon receiving the request sent by storage controller 312(1), storage controller 312(2) uses the unique asset identifier included in the request message to identify file 326 as a candidate file.

Upon identifying file 326 as a candidate file, and as depicted with the bubble numbered 6, storage controller 312(2) compares lists of extension values included in the request with attributes of the candidate file. For example, storage controller 312(2) could first compare a list of content length values (e.g., 8388608, 1040067) included in the request, with a file size attribute of the candidate file. Based on the comparison, storage controller 312(2) could determine that the file size attribute associated with file 326 matches at least one of the listed content length values. Storage controller 312(2) could then compare the list of checksum values to the checksum attribute of the candidate file. Storage controller 312(2) could determine that the checksum attribute of file 326 matches at least one of the listed checksum values.

As depicted with the bubble numbered 7, storage controller 312(2) sends a copy of file 326 to cache device 310(1). Upon determining that, for each extension value field included in the set of extension value fields 220, an attribute of the candidate file matches at least one listed value, storage controller 312(2) determines that file 326 is a valid version of the asset, and transmits file 326 to cache device 310(1). Receiving file 326 enables cache device 310(1) to successfully reload the asset.

Figure 4:
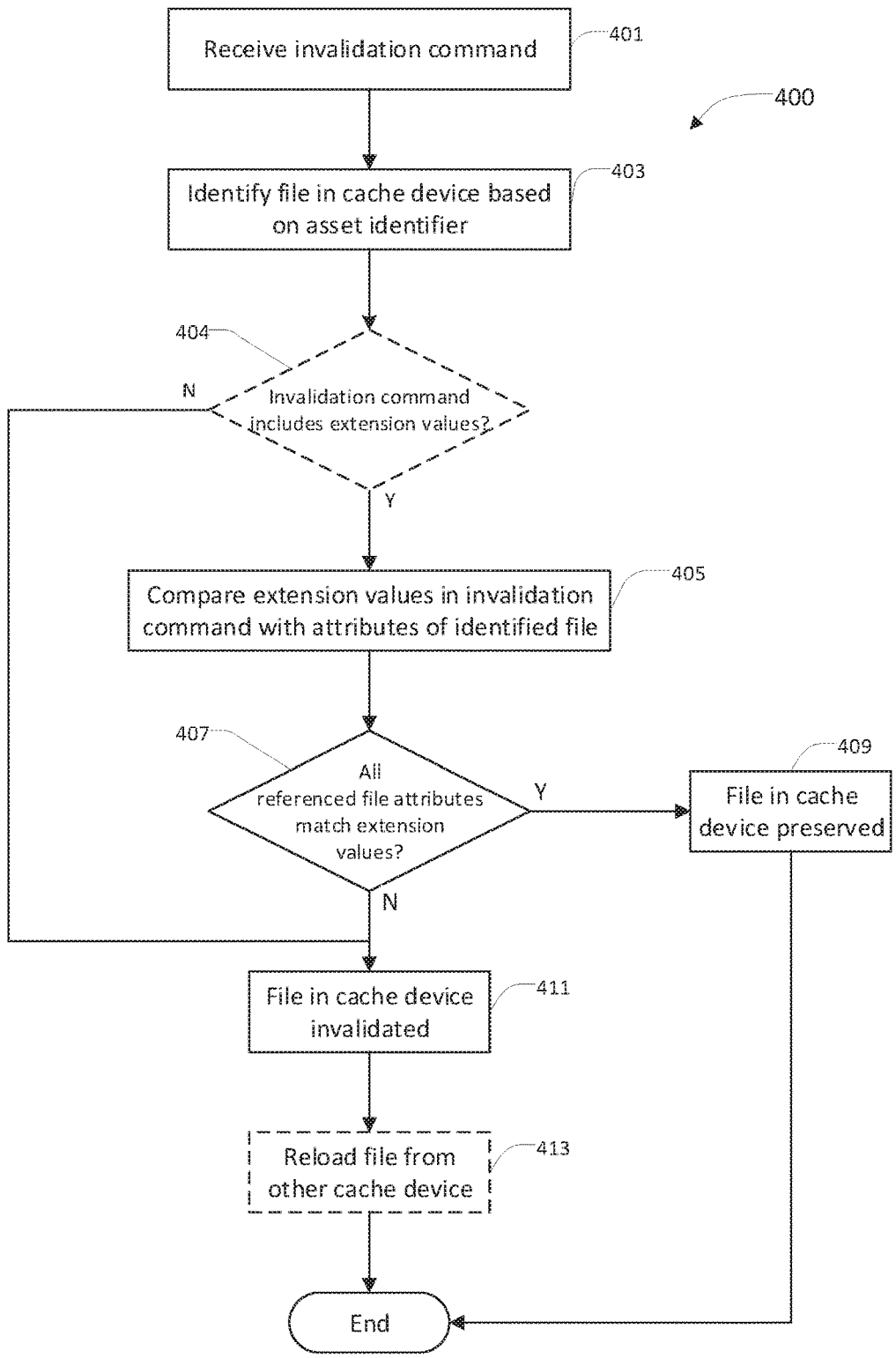
FIG. 4 sets forth a flow diagram of method steps for invalidating and reloading a file stored in a cache device in the network infrastructure of FIG. 1, according to various embodiments of the present disclosure.

FIG. 4 sets forth a flow diagram of method steps for invalidating and reloading a file stored in a cache device in the network infrastructure of FIG. 1, according to various embodiments of the present disclosure. Although the method steps are described with reference to the systems of FIGS. 1-3, persons skilled in the art will understand that any system configured to implement the method steps, in any order, falls within the scope of the present invention.

As shown, method 400 begins at step 401, where a storage controller 324 receives a targeted invalidation command. In various embodiments, storage controller 324, included in control server 124 of content delivery network 120, may receive a targeted invalidation command for a given asset. Additionally or alternatively, storage controller 312, included in a particular cache device (e.g., storage controller 312(1) included in cache device 310(1)), may receive the targeted invalidation command.

In various embodiments, storage controller 324 may receive a targeted invalidation command that a user, such as a content manager or system administrator, generates via a user interface executed on control server 124 or a publisher device. Alternatively, one or more devices in network infrastructure 100 may generate the targeted invalidation command. For example, a device in CDN 120 could compare files that correspond to an asset and could generate the targeted invalidation command upon determining that one or more attributes for the files do not match. The targeted invalidation command may include an identifier for the asset (e.g., a unique asset identifier generated from an initial request path 210 associated with the asset). The targeted invalidation command may also include a set of extension value fields 220 that specify attributes associated with an asset, listing valid length(s), checksum(s), name(s), that are associated with valid copies of the asset.

At step 403, the storage controller 324, based on the asset identifier, identifies a file stored in a cache device 310. In various embodiments, the storage controller 324 uses the unique asset identifier included in the targeted invalidation command to locate a corresponding file that is stored in a cache device 310. In some embodiments, storage controller 324 could send, to storage controller 312(1) in cache device 310(1), a message that contains the unique asset identifier included in the targeted invalidation command. Alternatively, storage controller 312(1) could retrieve the unique asset identifier from a received targeted invalidation command. Additionally or alternatively, storage controller 312(1) may use the unique asset identifier to locate a file, stored within storage partition 314(1), that is associated with the unique asset identifier. In some embodiments, the unique asset identifier corresponds to a directory (e.g., the unique asset identifier specifies a path specified ending in a wildcard). In such instances, storage controller 312(1) identifies one or more files in cache device 310(1) based on the asset identifier (e.g., all files within the specified directory).

At step 404, the storage controller 324 optionally determines whether the targeted invalidation command includes any values in one or more extension value fields 220. When storage controller 324 determines that no values are listed in any extension value fields 220 in the targeted invalidation command, storage controller 324 proceeds to step 411. Otherwise, storage controller 324 identifies at least one value listed in at least one extension value field 220 and proceeds to step 405.

At step 405, the storage controller 324 compares values, included in the set of extension value fields 220 included in the targeted invalidation command, with attributes of the identified file. In various embodiments, storage controller 324 and/or storage controller 312(1) may retrieve one or more values from a set of extension value fields 220 included in the targeted invalidation command. For each extension value field 220, the storage controller may compare the attribute of the file with one or more values listed in the extension value field 220, and may determine whether the attribute matches at least one of the listed values. For example, storage controller 312(1) could compare a content length attribute of the identified file to a list of content lengths or a range of content lengths (e.g., a range of {10000, 15000}) specified by the content length extension value field 222 included in the targeted invalidation command. Storage controller 312(1) could then compare a checksum attribute of the identified file to a list of one or more checksums included in a checksum extension value field 224 included in the targeted invalidation command.

At step 407, the storage controller 324 determines whether all referenced file attributes match values in the set of extension value fields 220. In various embodiments, storage controller 324 and/or storage controller 312(1) may determine whether, for each extension value field 220, the identified file stored in cache device 310(1) has a corresponding attribute that matches at least one of the listed values. When the storage controller 324 determines that an attribute of the identified file matches at least one listed value for each of the set of extension value fields 220, the storage controller 324 proceeds to step 409. Otherwise, the storage controller 324 determines that, for at least one extension value field 220, an attribute associated with the identified file does not match any of the listed values, and proceeds to step 411.

At step 409, the storage controller 324 preserves the file in the cache device 310 or causes the file to be preserved in the cache device 310. In some embodiments, storage controller 324 and/or storage controller 312(1) may determine that, for each extension value field 220 included in the targeted invalidation command, an attribute of the identified file matches at least one of the listed values. In such instances, the storage controller 324 may determine that the identified file is valid and is not subject to invalidation. Upon determining that the identified file is valid, storage controller 324 causes the file in storage partition 314(1) to be preserved.

At step 411, the storage controller 324 invalidates the file in the cache device. In some embodiments, storage controller 324 and/or storage controller 312(1) may determine that, for at least one extension value field 220, an attribute associated with the identified file does not match any of the listed values. In such instances, storage controller 312(1) determines that the identified file is an invalid copy of the asset and is subject to invalidation. Storage controller 312(1) may mark the identified file as invalid, marking the identified file as subject to being erased and/or overwritten.

At step 413, the storage controller 324 may optionally reload the file from a different cache device. In some embodiments, storage controller 324 and/or storage controller 312(1) may optionally respond to invalidating the identified file by reloading a valid version of the asset from a different device, such as origin server 122, or a different cache device 310, such as cache device 310(2). For example, storage controller 312(1) could reload the asset by sending a request message to cache device 310(2) in order to receive a valid version of the asset. In some embodiments, the different cache device 310(2) may be a peer of the requesting cache device 310(1). For example, when edge cache device 140(2) invalidates a file, edge cache device 140(2) could send a request to peer edge cache device 140(4) in order to receive a valid version of the file. In some embodiments, the different cache device 310(2) may be a parent of the requesting cache device 310(1). For example, edge cache device 140(2), upon invalidating the file, could send a request message its parent mid-tier cache device 130(1) in order to receive a valid version of the asset.

Additionally or alternatively, the other cache device 310(2), upon receiving a request to send a valid version of the asset, may determine whether a valid version of the asset is stored within the other cache device 310(2). In such instances, the other cache device 310(2) may perform an invalidation check on a candidate file stored in the other cache device 310(2) by comparing lists of values, included in the request, to attributes of a candidate file. In such instances, the other cache device 310(2) only sends the candidate file upon determining that the candidate file is a valid version of the asset. For example, edge cache device 140(4) could receive a request to send a file, where the request includes the unique asset identifier and lists of values (corresponding to listed values for each respective extension value field 220) included in the targeted invalidation command. In such instances, the storage controller (e.g., storage controller 312(2)) included in edge cache device 140(4)

could use the unique asset identifier to identify a corresponding candidate file, then compare the respective lists of values to attributes of the candidate file. Upon determining that attributes of the candidate file match at least one listed value for each of the respective lists of values, edge cache device 140(4) could then send a copy of the candidate file to the cache device 140(2).

Figure 5:
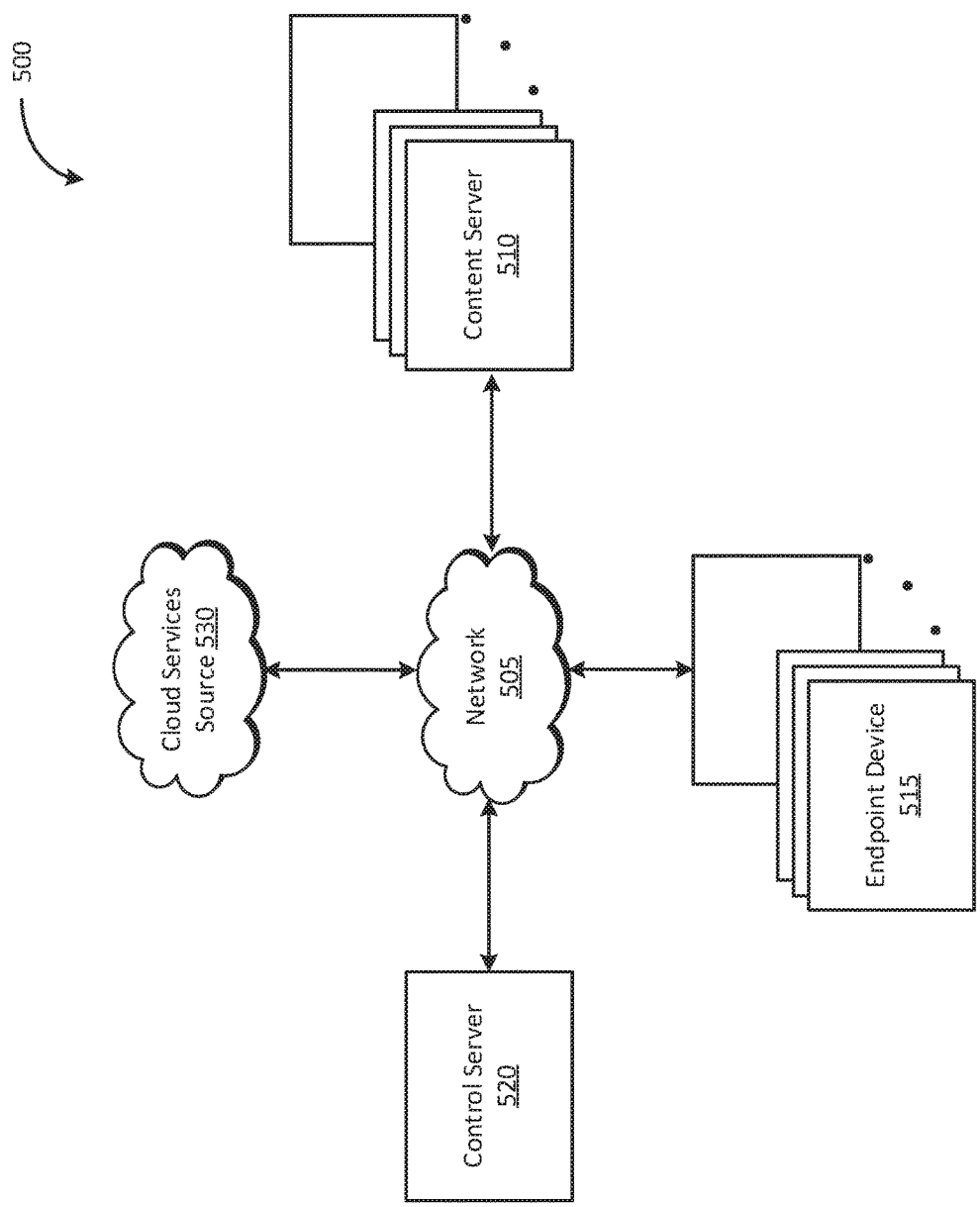
FIG. 5 illustrates a network infrastructure configured to implement one or more aspects of the present disclosure.

FIG. 5 illustrates network infrastructure 500 that includes the network infrastructure 100 of FIG. 1, according to various embodiments of the present invention. As shown, network infrastructure 500 includes endpoint devices 515, content servers 510, and control server 520, each of which are connected via communications network 505. Network infrastructure 500 is configured to distribute content to content servers 510, and such content is then distributed on demand to endpoint devices 515.

Each endpoint device 515 communicates with one or more content servers 510 (also referred to as "caches" or "nodes") in order to download content, such as textual data, graphical data, audio data, video data, and other types of data. The downloadable content, also referred to herein as a "file," is then presented to a user of one or more endpoint devices 515. In various embodiments, endpoint devices 515 may include computer systems, set-top boxes (STBs), mobile computers, smartphones, tablets, console and handheld video game systems, digital video recorders (DVRs), DVD players, connected digital TVs, dedicated media streaming devices (e.g., the Roku® set-top box), and/or any other technically-feasible computing platform that has network connectivity and is capable of presenting content, such as text, images, audio, and/or video content, to a user.

Each content server 510 includes, without limitation, a storage device that may be a standalone networked attached storage (NAS) system, a storage area-network (SAN), a cluster or "farm" of storage devices, a distributed storage architecture, or any other device suitable for implementing one or more aspects of the present disclosure. Additionally or alternatively, each content server 510 may include, without limitation, a computing device with a storage subsystem that may be a standalone server, a cluster or "farm" of servers, one or more network appliances, or any other device suitable for implementing one or more aspects of the present disclosure. Each content server 510 may include, without limitation, a web server and a database, and may be configured to communicate with the control server 520 to determine the location and availability of various files that are monitored and managed by the control server 520. Each content server 510 may further communicate with cloud services source 530 and one or more other content servers 510 in order "fill" each content server 510 with copies of various files. In addition, the content servers 510 may respond to requests for files received from the endpoint devices 515. The files may then be distributed from the content server 510 or via a broader content distribution network. In some embodiments, the content servers 510 enable users to authenticate (e.g., using a username and password) in order to access files stored on the content servers 510.

Control server 520 may include, without limitation, a computing device that may be a standalone server, a cluster or "farm" of servers, one or more network appliances, or any other device suitable for implementing one or more aspects of the present disclosure. Although only a single control server 520 is shown in FIG. 5, in various embodiments multiple control servers 520 (e.g., control server 520(1), 520(2), etc.) may be implemented to monitor and manage files.

In various embodiments, cloud services source 530 may include an online storage service (OSS) (e.g., Amazon® Simple Storage Service, Google® Cloud Storage, etc.) in which a catalog of thousands or millions of files is stored and/or accessed in order to fill content servers 510. Cloud services source 530 also may provide computing and/or other processing services. Although only one cloud services source 530 is shown in FIG. 5, in various embodiments, multiple cloud services sources 530 (e.g., cloud services source 530(1), 530(2), etc.) may be implemented.

Figure 6:
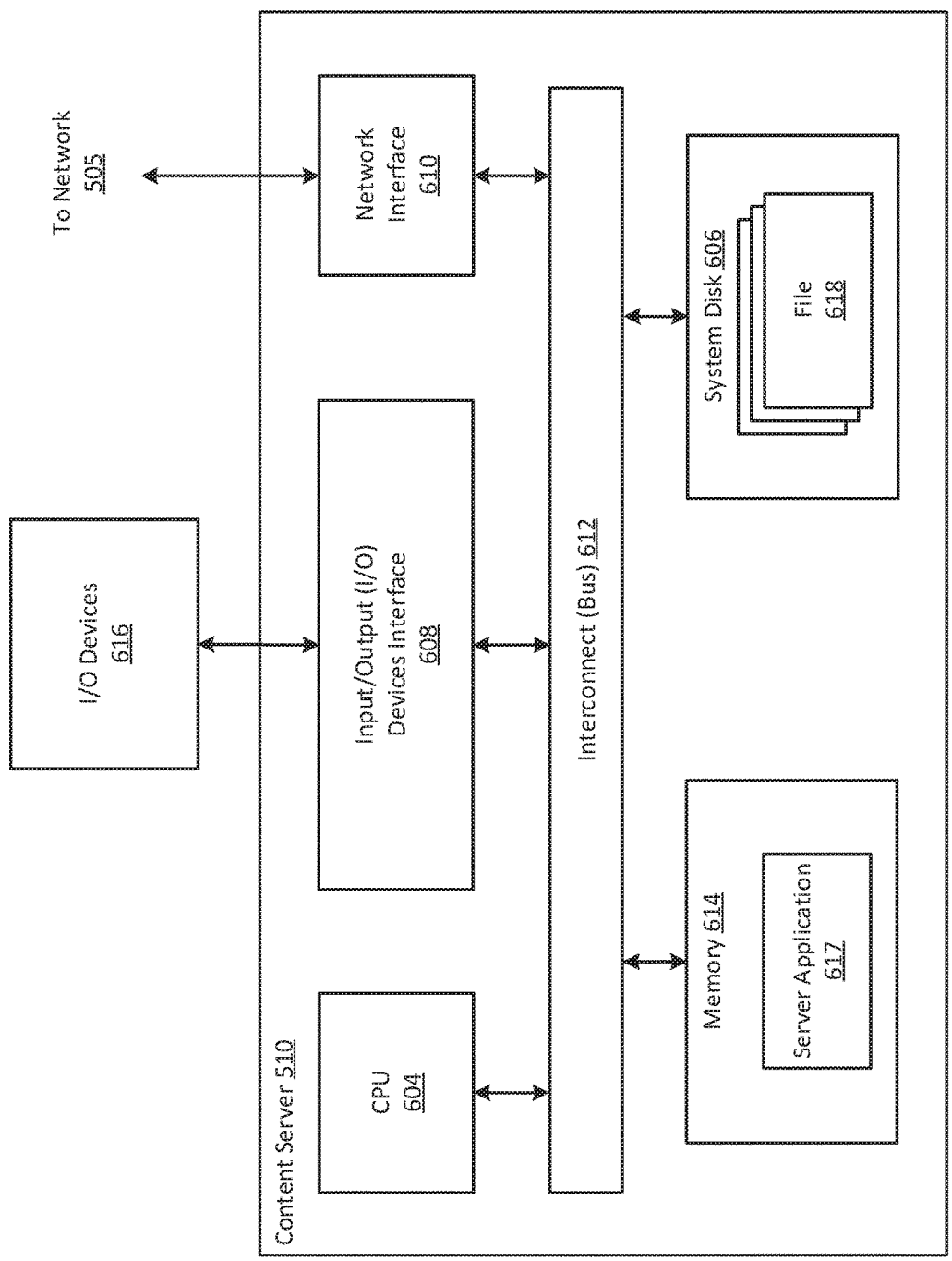
FIG. 6 is a more detailed illustration of the content server of FIG. 5, according to various embodiments of the present disclosure.

FIG. 6 is a more-detailed illustration of the content server 510 of FIG. 5, according to various embodiments of the present invention. As shown, content server 510 includes, without limitation, central processing unit (CPU) 604, system disk 606, input/output (I/O) devices interface 608, network interface 610, interconnect (bus) 612, and system memory 614.

CPU 604 is configured to retrieve and execute programming instructions, such as server application 617, stored in system memory 614. Similarly, CPU 604 is configured to store application data (e.g., software libraries) and retrieve application data from system memory 614. Interconnect 612 is configured to facilitate transmission of data, such as programming instructions and application data, between CPU 604, system disk 606, I/O device interface 608, network interface 610, and system memory 614. I/O device interface 608 is configured to receive input data from one or more I/O devices 616 and transmit the input data to CPU 604 via interconnect 612. For example, the one or more I/O devices 616 may include one or more buttons, a keyboard, a mouse, and/or other input devices. I/O device interface 608 is further configured to receive output data from CPU 604 via interconnect 612 and transmit the output data to the one or more I/O devices 616.

System disk 606 may include one or more hard disk drives (HDDs), solid-state storage devices (SSDs), and/or similar storage devices. System disk 606 is configured to store nonvolatile data, such as one or more files 618 (e.g., audio files, video files, subtitles, application files, software libraries, etc.). Files 618 can then be retrieved by one or more endpoint devices 515 via network 505. In some embodiments, network interface 610 is configured to operate in compliance with one or more communications standards, such as the Ethernet standard, the Bluetooth standard, and/or one or more wireless communication standards.

System memory 614 includes server application 617, which configures content server 510, to service requests received from endpoint device 515 and other content servers 510. For example, the service request could be for one or more files 618. When server application 617 receives a service request for a specific file, server application 617 retrieves the corresponding file 618 from system disk 606 and transmits file 618 to endpoint device 515 and/or content server 510 via network 505.

File 618 could, for example, be one of a plurality of digital items, such as visual content items like videos and/or still images. Similarly, file 618 could be one of a plurality of textual content items associated with one or more visual content items, such as movie metadata. In various embodiments, file 618 may be a one of a plurality of secure application data items associated with one or more content items and/or applications being executed by content server 510, control server 520, and/or endpoint device 515.

Figure 7:
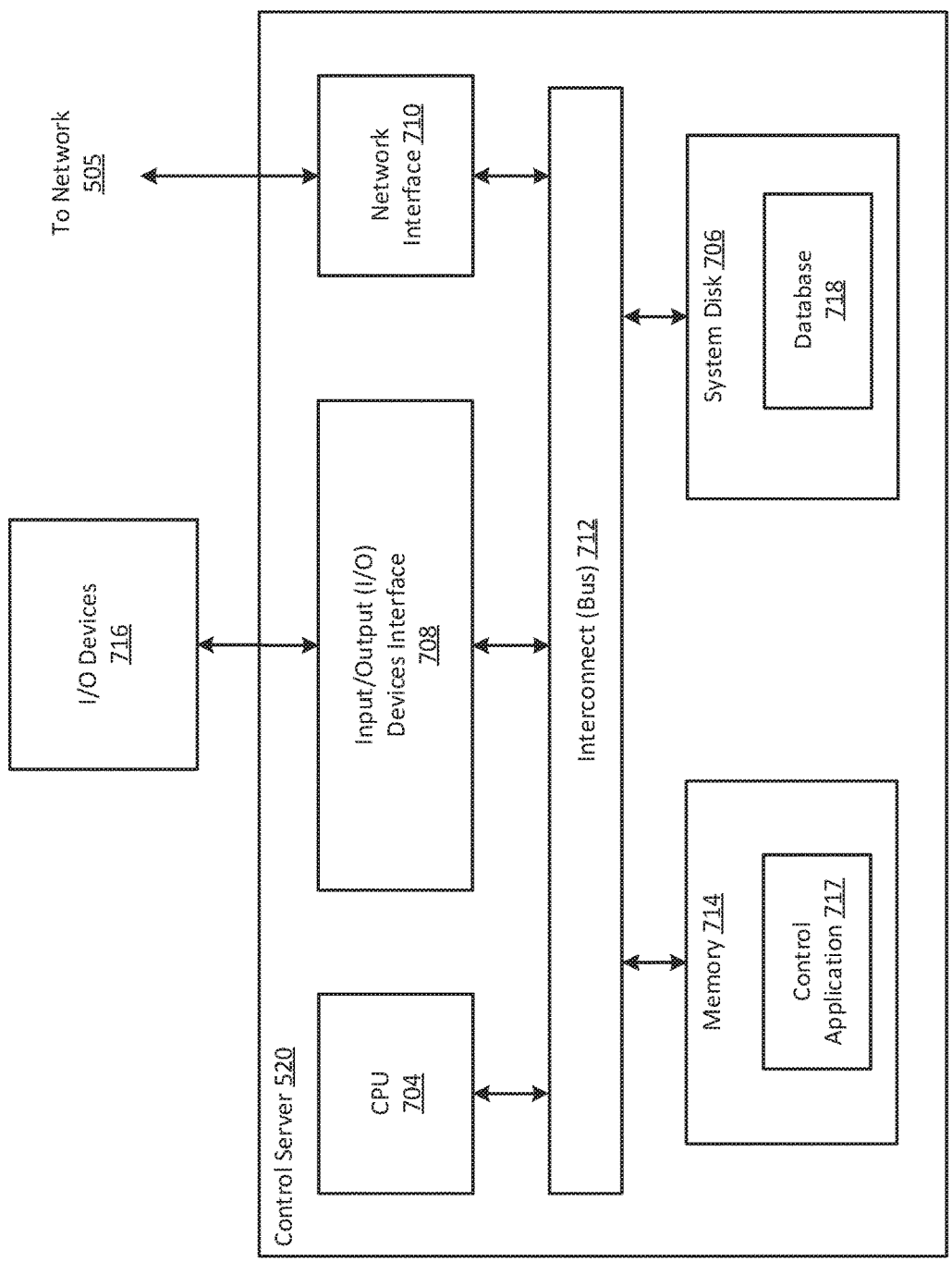
FIG. 7 is a more detailed illustration of the control server of FIG. 5, according to various embodiments of the present disclosure.

FIG. 7 is a more-detailed illustration of the control server 520 of FIG. 5, according to various embodiments of the present invention. As shown, control server 520 includes, without limitation, CPU 704, system disk 706, I/O devices interface 708, network interface 710, interconnect 712, and system memory 714.

CPU 704 is configured to retrieve and execute programming instructions, such as control application 717, stored in system memory 714. Similarly, CPU 704 is configured to store application data (e.g., software libraries) and retrieve application data from system memory 714 and/or database 718 that is stored in system disk 706. Interconnect 712 is configured to facilitate transmission of data between CPU 704, system disk 706, I/O devices interface 708, network interface 710, and system memory 714. I/O devices interface 708 is configured to transmit input data and output data between the one or more I/O devices 716 and CPU 704 via interconnect 712. In various embodiments, system disk 706 may include one or more hard disk drives, solid state storage devices, etc. In various embodiments, system disk 706 is configured to store database 718 that stores information associated with one or more content servers 510, cloud services source 530, and/or files 618.

System memory 714 includes control application 717 configured to access information stored in database 718 and process the information to determine the manner in which specific files 618 will be replicated across content servers 510 included in network infrastructure 500. Control application 717 may further be configured to receive and analyze performance characteristics associated with one or more content servers 510 and/or endpoint devices 515.

Figure 8:
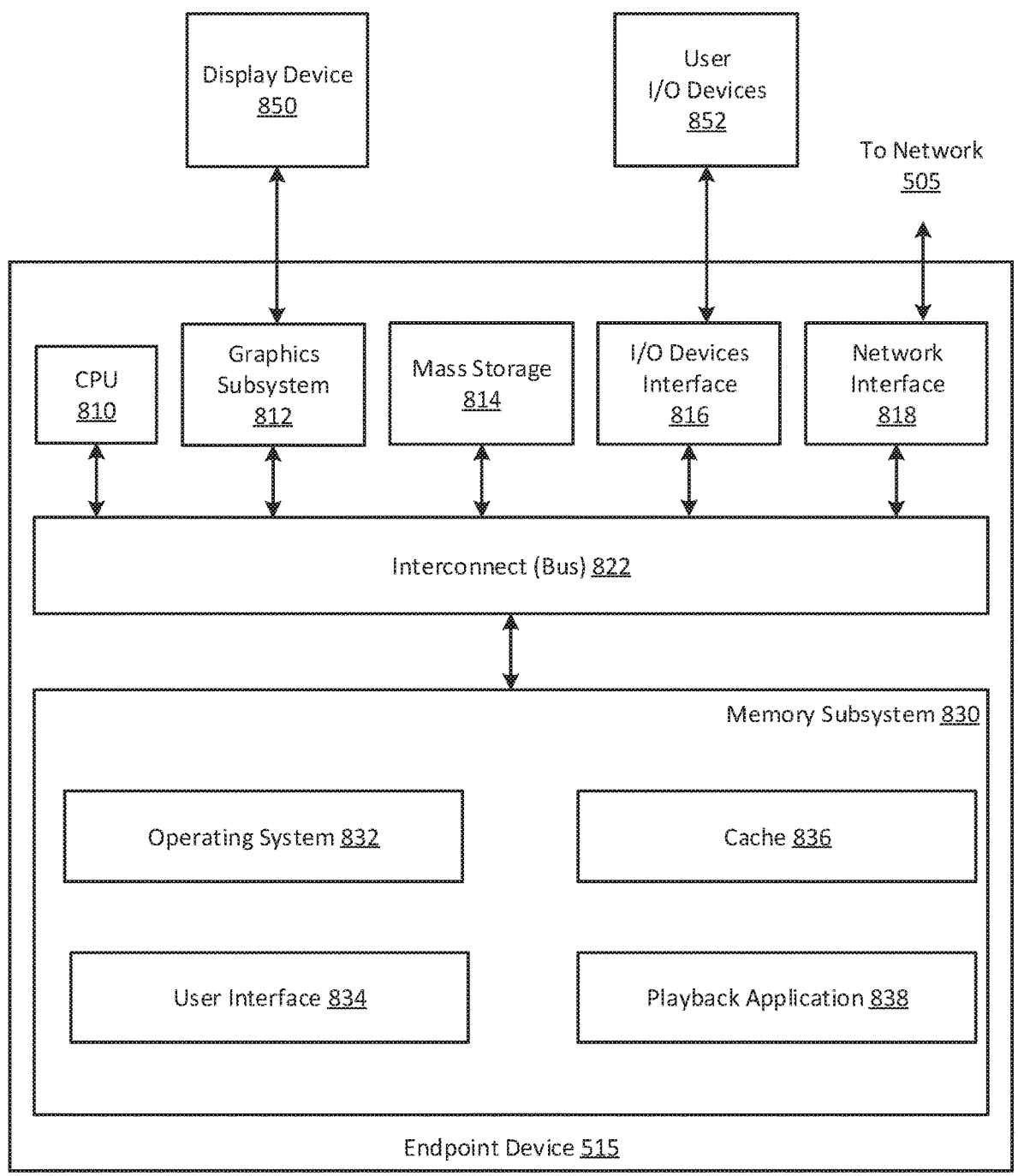
FIG. 8 is a more detailed illustration of the endpoint device of FIG. 5, according to various embodiments of the present disclosure.

FIG. 8 is a more-detailed illustration of the endpoint device 515 of FIG. 5, according to various embodiments of the present invention. As shown, endpoint device 515 may include, without limitation, CPU 810, graphics subsystem 812, mass storage unit 814, I/O devices interface 816, network interface 818, interconnect 822, and memory subsystem 830.

In some embodiments, CPU 810 is configured to retrieve and execute programming instructions stored in memory subsystem 830. Similarly, CPU 810 is configured to store and retrieve application data (e.g., software libraries) residing in the memory subsystem 830. Additionally or alternatively, CPU 810 is configured to store and retrieve data, including content items and/or application data, from mass storage unit 814. Interconnect 822 is configured to facilitate transmission of data, such as programming instructions and application data, between the CPU 810, graphics subsystem 812, mass storage unit 814, I/O devices interface 816, network interface 818, and memory subsystem 830.

Graphics subsystem 812 is configured to generate frames of video data and transmit the frames of video data to display device 850. In various embodiments, graphics subsystem 812 may be integrated, along with CPU 810, into an integrated circuit (IC). Display device 850 may comprise any technically-feasible means for generating an image for display. For example, display device 850 could be fabricated using liquid crystal display (LCD) technology, cathode-ray tube technology, and/or light-emitting diode (LED) display technology.

Mass storage unit 814 can include, for example, a hard disk drive and/or flash-memory storage drive, and is configured to store nonvolatile data. For example, mass storage unit 814 could store one or more files 618, such as content items and/or application data. In various embodiments, endpoint device 515 may copy one or more files 618 stored in memory subsystem 830 (e.g., secure application data) to mass storage unit 814.

Input/output (I/O) device interface 816 is configured to receive input data from user one or more I/O devices 852 and transmit the input data to CPU 810 via interconnect 822. For example, user I/O device 852 may comprise one of more buttons, a keyboard, and a mouse or other pointing device. In various embodiments, I/O device interface 816 also includes an audio output unit configured to generate an electrical audio output signal. In such instances, user I/O device 852 may include an audio output device, such as headphones and/or a loudspeaker, configured to generate an acoustic output in response to the electrical audio input signal. Additionally or alternatively, display device 850 may include the loudspeaker. Examples of suitable devices known in the art that can display video frames and generate an acoustic output include televisions, smartphones, smartwatches, electronic tablets, etc.

Network interface 818 is configured to transmit and receive packets of data via network 505. In some embodiments, network interface 818 is configured to communicate using at least one of the Ethernet standard, the Bluetooth standard, and/or one or more wireless communication standards. Network interface 818 is coupled to CPU 810 via interconnect 822.

Memory subsystem 830 includes programming instructions and application data. In various embodiments, memory subsystem may include operating system 832, user interface 834, playback application 838, and/or page cache 836. Operating system 832 performs system management functions, such as managing hardware devices including graphics subsystem 812, mass storage unit 814, I/O device interface 816, and network interface 818. Operating system 832 also provides process and memory management models for user interface 834, playback application 838, and page cache 836. For example, endpoint device 515 may execute operating system 832 to write data to page cache 836 and/or sync data included in page cache 836 to mass storage unit 814.

User interface (UI) 834, for example, a graphical user interface (GUI) employing a window-and-object metaphor, provides a mechanism for user interaction with endpoint device 515. Persons skilled in the art will recognize the various operating systems 832 and/or user interfaces 834 that are suitable for incorporation into endpoint device 515. Playback application 838 is configured to request and/or receive content (e.g., one or more files 618) from content server 510 via network interface 818. Further, playback application 838 is configured to interpret the content and present the content via display device 850 and/or user I/O devices 852.

Page cache 836 is a portion of volatile memory that stores files 618, such as content items and/or application data (e.g., secure application data, metadata, etc.). In various embodiments, page cache 836 may correspond to a section of nonvolatile memory. In such instances, endpoint device 515 may sync data initially written into volatile memory by writing the data to the corresponding section of nonvolatile memory. For example, page cache 836 may correspond to a section of mass storage unit 814. In such instances, endpoint device 515 then reads and/or writes files 618 to page cache 836 in lieu of accessing and/or writing files 618 directly in mass storage unit 814. Endpoint device 515 could then sync data between page cache 836 and mass storage unit 814 so that copies of data are stored in both page cache 836 and mass storage unit 814.

In sum, a storage controller receives a targeted invalidation command associated with an asset. The targeted invalidation command identifies the asset using a unique asset identifier. The targeted invalidation command also includes a set of extension value fields that list one or more values that correspond to attribute values of a valid version of the asset. The storage controller uses the unique asset identifier to locate a candidate file stored in a given device. The storage controller then compares, for each of the extension value fields, a list of values, with attributes of the candidate file. The storage controller determines that the candidate file is a valid version of the asset when, for each of the extension value fields, the candidate file has attributes that match at least one of the listed values included in the extension value field. Otherwise, upon determining that an attribute of the candidate file does not match any listed value for at least one extension value field, the storage controller causes the candidate file to be invalidated. The storage controller then causes another device to send a valid version of the asset to the given device. In some embodiments, the given device may receive the valid version of the asset from a peer device. Alternatively, the given device may receive the valid version of the asset from a parent device.

At least one technological advantage of the disclosed techniques relative to the prior art is that cache devices within a content distribution network can effectively remove bad copies of a given asset without requiring network-wide invalidation of the asset. In particular, because a storage controller invalidates a file corresponding to a specified identifier that has attributes that do not match listed values specified by one or more fields included in a targeted invalidation command, a cache device causes a valid copy of an asset to be preserved, while causing an invalid copy of the asset, which changed at some point during distribution, storage, or use, to be removed. These technical advantages provide one or more technological advancements over prior art approaches.

1. In various embodiments, a computer-implemented method comprises receiving an invalidation command that includes (i) a first asset identifier, and (ii) a set of one or more extension value fields, identifying a first file that is stored in a first cache device and is associated with an identifier matching the first asset identifier, comparing a set of attributes of the first file to the set of one or more extension value fields, and upon determining that, for each extension value field included in the set of one or more extension value fields, at least one attribute included in the set of attributes of the first file matches at least one value of the extension value field, causing the first file in the first cache device to be preserved, or upon determining that, for at least one extension value field included in the set of one or more extension value fields, at least one attribute of the first file does not match at least one value of the extension value field, causing the first file to be invalidated.

2. The computer-implemented method of clause 1, where the first asset identifier is based on at least a uniform resource identifier (URI) associated with a first asset.

3. The computer-implemented method of clause 1 or 2, where the set of one or more extension value fields includes a field corresponding to a content length of a file.

4. The computer-implemented method of any of clauses 1-3, where the set of one or more extension value fields includes a field corresponding to a checksum of a file.

5. The computer-implemented method of any of clauses 1-4, further comprising, upon invalidating the first file, sending a request to a second cache device, where the second cache device is a peer to the first cache device, and the second cache device sends a second file to the first cache device in response to the request.

6. The computer-implemented method of any of clauses 1-5, where the second cache device compares a set of attributes of the second file to the set of one or more extension value fields, and upon determining that, for each extension value field included in the set of one or more extension value fields, at least one attribute included in the set of attributes of the second file matches at least one value of the extension value field, sends the second file to the first cache device.

7. The computer-implemented method of any of clauses 1-6, further comprising, upon invalidating the first file, sending a request to a second cache device, where the second cache device is a parent to the first cache device, and the second cache device sends a second file to the first cache device in response to the request.

8. The computer-implemented method of any of clauses 1-7, further comprising upon determining that, for at least one extension value field included in the set of one or more extension value fields, at least one attribute of the first file does not match at least one value of the extension value field, reloading a portion of the first file by determining a portion of the first file that has attributes that do not match at least one value of the extension value field, where the portion is smaller than the entire first file, and requesting that at least one other cache device send, to the first cache device, a portion of a second file that corresponds to the portion of the first file.

9. The computer-implemented method of any of clauses 1-8, where the first asset identifier comprises a directory, and further comprising identifying a first directory that is stored in a first cache device and is associated with an identifier matching the first asset identifier, comparing a first set of attributes of a first file and a second set of attributes of a second file, included in the first directory, to the set of one or more extension value fields, and upon determining that, for each extension value field included in the set of one or more extension value fields, at least one attribute included in the first set of attributes of the first file and at least one attribute included in the second set of attributes of the second file match at least one value of the extension value field, causing the first file and the second file in the first cache device to be preserved, preserving both the first file and the second file, or upon determining that, for at least one extension value field included in the set of one or more extension value fields, at least one attribute included in the first set of attributes of the first file and at least one attribute included in the second set of attributes of the second file do not match at least one value of the extension value field, causing the first file and the second file to be invalidated.

10. The computer-implemented method of any of clauses 1-9, where the invalidation command is received from one of (i) a second cache device that is a parent to the first cache device, or (ii) an origin server.

11. In various embodiments, one or more non-transitory computer-readable storage media including instructions that, when executed by one or more processors, cause the one or more processors to perform the steps of receiving an invalidation command that includes (i) a first asset identifier, and (ii) a set of one or more extension value fields, identifying a first file that is stored in a first cache device and is associated with an identifier matching the first asset identifier, comparing a set of attributes of the first file to the set of one or more extension value fields, and upon determining that, for each extension value field included in the set of one or more extension value fields, at least one attribute included in the set of attributes of the first file matches at least one value of the extension value field, causing the first file in the first cache device to be preserved, or upon determining that, for at least one extension value field included in the set of one or more extension value fields, at least one attribute of the first file does not match at least one value of the extension value field, causing the first file to be invalidated.

12. The one or more non-transitory computer-readable storage media of clause 11, further including instructions that, when executed by the one or more processors, cause the one or more processors to perform the steps of upon invalidating the first file, sending a request to a second cache device, where the second cache device is a peer to the first cache device, or the second cache device is a parent to the first cache device, and the second cache device sends a second file to the first cache device.

13. The one or more non-transitory computer-readable storage media of clause 11 or 12, where the second cache device compares a set of attributes of the second file to the set of one or more extension value fields, and upon determining that, for each extension value field included in the set of one or more extension value fields, at least one attribute included in the set of attributes of the second file matches at least one value of the extension value field, sends the second file to the first cache device.

14. The one or more non-transitory computer-readable storage media of any of clauses 11-13, where the set of one or more extension value fields includes a first field corresponding to a content length of a file, and a second field corresponding to a checksum of the file.

15. The one or more non-transitory computer-readable storage media of any of clauses 11-14, where the first asset identifier comprises a wildcard pattern, and identifying the first file that is stored in the first cache device comprises determining that at least a portion of the identifier associated with the first file satisfies the wildcard pattern.

16. In various embodiments, a computing system for accessing data comprises a memory storing a storage controller application, and a processor that is coupled to the memory and executes the storage controller application to receive an invalidation command that includes (i) a first asset identifier, and (ii) a set of one or more extension value fields, identify a first file that is stored in a first cache device and is associated with an identifier matching the first asset identifier, compare a set of attributes of the first file to the set of one or more extension value fields, and upon determining that, for each extension value field included in the set of one or more extension value fields, at least one attribute included in the set of attributes of the first file matches at least one value of the extension value field, cause the first file in the first cache device to be preserved, or upon determining that, for at least one extension value field included in the set of one or more extension value fields, at least one attribute of the first file does not match at least one value of the extension value field, cause the first file to be invalidated.

17. The computing system of clause 16, where the processor further executes the storage controller application to upon invalidating the first file, send a request to a second cache device, where the second cache device is a peer to the first cache device, or the second cache device is a parent to the first cache device, and the second cache device sends a second file to the first cache device.

18. The computing system of clause 16 or 17, where the second cache device compares a set of attributes of the second file to the set of one or more extension value fields, and upon determining that, for each extension value field included in the set of one or more extension value fields, at least one attribute included in the set of attributes of the second file matches at least one value of the extension value field, sends the second file to the first cache device.

19. The computing system of any of clauses 16-18, where the set of one or more extension value fields includes a first field corresponding to a content length of a file, and a second field corresponding to a checksum of the file.

20. The computing system of any of clauses 16-19, where the invalidation command is received from one of (i) a second cache device that is a parent to the first cache device, or (ii) an origin server.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
   receiving an invalidation command that includes (i) a first asset identifier, and (ii) a set of one or more extension value fields;
   identifying a first file that is stored in a first cache device and is associated with an identifier matching the first asset identifier;
   comparing a set of attributes of the first file to the set of one or more extension value fields; and
   upon determining that, for each extension value field included in the set of one or more extension value fields, at least one attribute included in the set of attributes of the first file matches at least one value of the extension value field, causing the first file in the first cache device to be preserved, or
   upon determining that, for at least one extension value field included in the set of one or more extension value fields, at least one attribute of the first file does not match at least one value of the extension value field, causing the first file to be invalidated.

2. The computer-implemented method of claim 1, wherein the first asset identifier is based on at least a uniform resource identifier (URI) associated with a first asset.

3. The computer-implemented method of claim 1, wherein the set of one or more extension value fields includes a field corresponding to a content length of a file.

4. The computer-implemented method of claim 1, wherein the set of one or more extension value fields includes a field corresponding to a checksum of a file.

5. The computer-implemented method of claim 1, further comprising, upon invalidating the first file, sending a request to a second cache device, wherein:
   the second cache device is a peer to the first cache device; and
   the second cache device sends a second file to the first cache device in response to the request.

6. The computer-implemented method of claim 5, wherein the second cache device:
   compares a set of attributes of the second file to the set of one or more extension value fields, and
   upon determining that, for each extension value field included in the set of one or more extension value fields, at least one attribute included in the set of attributes of the second file matches at least one value of the extension value field, sends the second file to the first cache device.

7. The computer-implemented method of claim 1, further comprising, upon invalidating the first file, sending a request to a second cache device, wherein:
   the second cache device is a parent to the first cache device; and
   the second cache device sends a second file to the first cache device in response to the request.

8. The computer-implemented method of claim 1, further comprising upon determining that, for at least one extension value field included in the set of one or more extension value fields, at least one attribute of the first file does not match at least one value of the extension value field, reloading a portion of the first file by:
   determining a portion of the first file that has attributes that do not match at least one value of the extension value field, wherein the portion is smaller than the entire first file; and
   requesting that at least one other cache device send, to the first cache device, a portion of a second file that corresponds to the portion of the first file.

9. The computer-implemented method of claim 1, wherein the first asset identifier comprises a directory, and further comprising:
   identifying a first directory that is stored in a first cache device and is associated with an identifier matching the first asset identifier;
   comparing a first set of attributes of a first file and a second set of attributes of a second file, included in the first directory, to the set of one or more extension value fields; and
   upon determining that, for each extension value field included in the set of one or more extension value fields, at least one attribute included in the first set of attributes of the first file and at least one attribute included in the second set of attributes of the second file match at least one value of the extension value field, causing the first file and the second file in the first cache device to be preserved, preserving both the first file and the second file, or
   upon determining that, for at least one extension value field included in the set of one or more extension value fields, at least one attribute included in the first set of attributes of the first file and at least one attribute included in the second set of attributes of the second file do not match at least one value of the extension value field, causing the first file and the second file to be invalidated.

10. The computer-implemented method of claim 1, wherein the invalidation command is received from one of (i) a second cache device that is a parent to the first cache device, or (ii) an origin server.

11. One or more non-transitory computer-readable storage media including instructions that, when executed by one or more processors, cause the one or more processors to perform the steps of:
- receiving an invalidation command that includes (i) a first asset identifier, and (ii) a set of one or more extension value fields;
- identifying a first file that is stored in a first cache device and is associated with an identifier matching the first asset identifier;
- comparing a set of attributes of the first file to the set of one or more extension value fields; and
- upon determining that, for each extension value field included in the set of one or more extension value fields, at least one attribute included in the set of attributes of the first file matches at least one value of the extension value field, causing the first file in the first cache device to be preserved, or
- upon determining that, for at least one extension value field included in the set of one or more extension value fields, at least one attribute of the first file does not match at least one value of the extension value field, causing the first file to be invalidated.

12. The one or more non-transitory computer-readable storage media of claim 11, further including instructions that, when executed by the one or more processors, cause the one or more processors to perform the steps of:
- upon invalidating the first file, sending a request to a second cache device, wherein:
  - the second cache device is a peer to the first cache device, or the second cache device is a parent to the first cache device; and
  - the second cache device sends a second file to the first cache device.

13. The one or more non-transitory computer-readable storage media of claim 12, wherein the second cache device:
- compares a set of attributes of the second file to the set of one or more extension value fields, and
- upon determining that, for each extension value field included in the set of one or more extension value fields, at least one attribute included in the set of attributes of the second file matches at least one value of the extension value field, sends the second file to the first cache device.

14. The one or more non-transitory computer-readable storage media of claim 11, wherein the set of one or more extension value fields includes:
- a first field corresponding to a content length of a file; and
- a second field corresponding to a checksum of the file.

15. The one or more non-transitory computer-readable storage media of claim 11, wherein:
- the first asset identifier comprises a wildcard pattern, and
- identifying the first file that is stored in the first cache device comprises determining that at least a portion of the identifier associated with the first file satisfies the wildcard pattern.

16. A computing system for accessing data, the computing system comprising:
- a memory storing a storage controller application; and
- a processor that is coupled to the memory and executes the storage controller application to:
  - receive an invalidation command that includes (i) a first asset identifier, and (ii) a set of one or more extension value fields;
  - identify a first file that is stored in a first cache device and is associated with an identifier matching the first asset identifier;
  - compare a set of attributes of the first file to the set of one or more extension value fields; and
  - upon determining that, for each extension value field included in the set of one or more extension value fields, at least one attribute included in the set of attributes of the first file matches at least one value of the extension value field, cause the first file in the first cache device to be preserved, or
  - upon determining that, for at least one extension value field included in the set of one or more extension value fields, at least one attribute of the first file does not match at least one value of the extension value field, cause the first file to be invalidated.

17. The computing system of claim 16, wherein the processor further executes the storage controller application to:
- upon invalidating the first file, send a request to a second cache device, wherein:
  - the second cache device is a peer to the first cache device, or the second cache device is a parent to the first cache device; and
  - the second cache device sends a second file to the first cache device.

18. The computing system of claim 17, wherein the second cache device:
- compares a set of attributes of the second file to the set of one or more extension value fields, and
- upon determining that, for each extension value field included in the set of one or more extension value fields, at least one attribute included in the set of attributes of the second file matches at least one value of the extension value field, sends the second file to the first cache device.

19. The computing system of claim 16, wherein the set of one or more extension value fields includes:
- a first field corresponding to a content length of a file; and
- a second field corresponding to a checksum of the file.

20. The computing system of claim 16, wherein the invalidation command is received from one of (i) a second cache device that is a parent to the first cache device, or (ii) an origin server.

\* \* \* \* \*